US010686592B1

(12) United States Patent
Aghdam et al.

(10) Patent No.: US 10,686,592 B1
(45) Date of Patent: Jun. 16, 2020

(54) SYSTEM AND METHOD TO PROVIDE A SECURE COMMUNICATION OF INFORMATION

(71) Applicants: Majid Hatami Aghdam, Los Angeles, CA (US); Navid Bahrami, Los Angeles, CA (US)

(72) Inventors: Majid Hatami Aghdam, Los Angeles, CA (US); Navid Bahrami, Los Angeles, CA (US)

(73) Assignee: MONKEY SOLUTION LLC, Los Angeles, CA (US)

(*) Notice: Subject to any disclaimer, the term of this patent is extended or adjusted under 35 U.S.C. 154(b) by 4 days.

(21) Appl. No.: 16/418,888

(22) Filed: May 21, 2019

Related U.S. Application Data (60) Provisional application No. 62/818,476, filed on Mar. 14, 2019.

(51) Int. Cl.
*H04L 9/08* (2006.01)

(52) U.S. Cl.
CPC .............. *H04L 9/08* (2013.01); *H04L 9/0816* (2013.01); *H04L 9/0819* (2013.01); *H04L 9/0822* (2013.01); *H04L 9/0825* (2013.01); *H04L 9/0861* (2013.01); *H04L 9/0869* (2013.01)

(58) Field of Classification Search
CPC ....... H04L 9/08; H04L 9/0816; H04L 9/0819; H04L 9/0822; H04L 9/0825; H04L 9/0861; H04L 9/0869
See application file for complete search history.

(56) References Cited

U.S. PATENT DOCUMENTS

| | | | | |
|---|---|---|---|---|
| 5,751,813 A * | 5/1998 | Dorenbos | ........... | H04L 63/0442 380/270 |
| 6,868,160 B1 * | 3/2005 | Raji | ........... | H04L 9/302 380/277 |
| 8,910,274 B2 * | 12/2014 | Sanders | ........... | G06F 21/34 726/19 |
| 2008/0044023 A1 * | 2/2008 | Zorea | ........... | H04L 63/0464 380/270 |
| 2009/0271627 A1 * | 10/2009 | Cohen | ........... | H04L 9/0836 713/171 |
| 2013/0091351 A1 * | 4/2013 | Manges | ........... | H04L 9/14 713/153 |
| 2016/0094345 A1 * | 3/2016 | Chen | ........... | H04L 9/0866 380/28 |
| 2016/0241389 A1 * | 8/2016 | Le Saint | ........... | H04L 9/0844 |
| 2018/0012032 A1 * | 1/2018 | Radich | ........... | H04L 9/14 |
| 2019/0130128 A1 * | 5/2019 | Khassanov | ........... | G06F 21/6245 |

* cited by examiner

*Primary Examiner* — Christopher A Revak
(74) *Attorney, Agent, or Firm* — Barry Choobin; Patent 360

(57) ABSTRACT

A system and method for secure data communication between one or more senders and recipients is disclosed. The system comprising a server including a processor and a memory in communication with the processor, a database in communication with the server, and a user device associated with each sender and receiver including a storage medium configured to access the server via a network. The server is configured to generate a first key on initiating communication between sender and recipient, and assigns the first key to the recipient. A key generator generates a pair of keys and the pair of keys stored in the storage medium. The server performs encryption and decryption of data communicated between one or more senders and receiver via one or more communication modes.

11 Claims, 7 Drawing Sheets

SYSTEM AND METHOD TO PROVIDE A SECURE COMMUNICATION OF INFORMATION

BACKGROUND OF THE INVENTION

A. Technical Field

The present invention generally relates to encryption and decryption of data or message for communication over public network, and more specifically relates to a system and method to provide a secure communication of information such as message, voice, video data and files over IP communication.

B. Description of Related Art

When an electronic data or message content is sent via internet to a recipient, the data passes through a number of intermediators such as gateways and routers. During data transmission, any third parties could access the data and causes fault/malware actions over the data, which affects the privacy of electronic communication via internet. For that reason, parties using the internet to transmit sensitive data such as credit card information or business transaction information or military defense secretes usually desire to send as encrypted messages that can be decrypted only by the intended recipient.

In general, the communication of encrypted data uses shared keys such as public key and private key, which are not known to any third parties. These keys are used to encrypt and decrypt the data. The shared key must be available to the recipient to decrypt the encrypted data received from sender. This encryption and/or decryption is achieved using different algorithms such as symmetric and asymmetric algorithms. One of the best-known Public/Private key asymmetric encryption algorithms is RSA.

Public Key is the key, which is shared with the world and private key is kept with the owner of the public key. It is very important to protect private key from being reverse calculation from Public key which is a hard process. The RSA algorithm provides one of the highest securities and cryptographic capabilities known for public. However, RSA also has some drawback which may lead to complete failure of the algorithm one such drawback is permitting a threat actor to use a target's public key to generate a private key with some time and power. This attack is possible for common key lengths, including 1024 and 2048 bits.

Any RSA keys generated by the firm's flawed products are not truly randomized, and leaving them weak and therefore crackable. Cracking of RSA key requires the knowledge of a public key and not the physical access to the vulnerable device. The vulnerability does not depend on a weak or a faulty random number generator. Further, RSA keys generated by a vulnerable chip are also impacted. To avoid these drawbacks, the bug-ridden products authorized by many security standards such as NIST, FIPS 140-2 and CC EAL 5+ certified devices are available. These products are widely used to secure files and keys from risk.

Typically, the actual impact of the drawback depends on the usage scenario, availability of the public keys and the lengths of keys used. For instance, Infineon's cryptographic chips and TPMs are also integrated within authentication, signature and encryption tokens of other vendors and chips. Further, Google Chromebooks, HP, Lenovo and Fujitsu PCs and laptops, alongside routers and other devices are all affected.

It is important to note that RSA algorithms are not at fault here, but rather buggy products that mean the implementation of the security algorithm does not happen correctly and are not truly randomized. Therefore, there is a need for a system to eliminate RSA encryption key generation issues. Also, there is a need for a system and method to protect communication payload against unauthorized access, spoofing, man in the middle and brute force attack by providing double security.

SUMMARY OF THE INVENTION

The present invention discloses a system and method for communication between one or more senders and recipients.

The system comprises a computing device, a database in communication with the computing device, a user device in communication with the computing device is associated with each sender and receiver. The server comprises a processor and a memory in communication with the processor. The memory stores a set of instructions executable by the processor. The user device is configured to access the server via a network.

The computing device is configured to generate a first key on initiating communication between sender and recipient. The computing device is further configured to assign the first key to the recipient. The computing device is further configured to generate a pair of keys by a key generator, the pair of keys include a second key and a third key. The computing device is further configured to store the pair of keys in the storage medium. The computing device is further configured to perform encryption and decryption of data communicated between one or more senders and receiver via one or more communication modes. In one embodiment, the computing device is a server.

In one embodiment, the first key is an encoded public key of the server to encrypt and decrypt data from the user device. In one embodiment, the computing device is configured to seed one or more random keys for creating a pair of keys. In one embodiment, the second key is a recipient public key and the third key is a recipient private key. In one embodiment, the communication modes for encrypting and decrypting the data includes, but not limited to, point to point communication and point to multi-point communication.

In one embodiment, the data communicated between one or more senders and receiver via the point to point communication mode is encrypted by the server or computing device, which is detailed as follows. The computing device is configured to encrypt the data from the sender using the recipient public key. The computing device is further configured to encrypt the public key encrypted data using server public key of the sender. The computing device is further configured to store the encrypted data of the above step to the server. The computing device is further configured to decrypt the stored encrypted data using server public key of the sender. The computing device is further configured to encrypt the decrypted data using server public key of the recipient. The computing device is further configured to send the encrypted data to the recipient.

In one embodiment, the data communicated between one or more senders and receiver via the point to point communication mode is decrypted by the server or computing device, which is detailed as follows. The computing device is configured to decrypt the encrypted data using server public key of the recipient. The computing device is further configured to decrypt the public key decrypted data using recipient private key. The computing device is further configured to encode and store the decrypted data on the local storage medium of the system.

In one embodiment, the data communicated between one or more senders and receiver via the point to multi-point communication mode is encrypted by the server or computing device, which is detailed as follows. The computing device is configured to create a unique public key for a group, wherein the members of the group receive the public key. The computing device is further configured to encrypt the data using encoded group public key. The computing device is further configured to send the encrypted data to the server. The computing device is further configured to decrypt the data of sender of the group using encoded group public key and stored private key of individual members of the group. In another embodiment, the data communicated between one or more senders and receiver via the point to multi-point communication mode is encrypted by the server or computing device using a QR-code including a pair of QR private key and QR public key.

In one embodiment, the data communicated between one or more senders and receiver via the point to multi-point communication mode is decrypted by the server or computing device, which is detailed as follows. The computing device is configured to create a unique public key for a group, wherein the members of the group receive the public key. The computing device is further configured to encrypt the data using encoded group public key, and decrypt the data using stored private key of individual members of the group.

In one embodiment, method for communication between one or more senders and recipients is disclosed. The method is incorporated in a system comprising a computing device comprising a processor and a memory in communication with the processor, wherein the memory stores a set of instructions executable by the processor, a database in communication with the computing device, and a user device associated with each sender and receiver including the storage medium configured to access the computing device via a network. The method comprises a step of: generating a first key on the server on initiating communication between sender and recipient. The method further comprises a step of: assigning the first key to the recipient. The method further comprises a step of: generating a pair of keys by a key generator, the pair of keys include a second key and a third key. The method further comprises a step of: storing the pair of keys in the storage medium. The method further comprises a step of: encrypting and decrypting data communicated between one or more senders and receivers via one or more communication modes.

In one embodiment, the computing device is a server. In one embodiment, the first key is an encoded public key of the server to encrypt and decrypt data from the user device. In one embodiment, the computing device is configured to seed one or more random keys for creating a pair of keys. In one embodiment, the second key is a recipient public key and the third key is a recipient private key. In one embodiment, the communication modes for encrypting and decrypting the data includes, but not limited to, point to point communication and point to multi-point communication.

In one embodiment, the step of encrypting data communicated between one or more senders and receivers via point to point communication further comprises: encrypting the data from the sender using the recipient public key; encrypting the public key encrypted data using server public key of the sender; storing the encrypted data of the above step to the server; decrypting the stored encrypted data using server public key of the sender; encrypting the decrypted data using server public key of the recipient, and sending the encrypted data to the recipient.

In one embodiment, the step of decrypting data communicated between one or more senders and receivers via point to point communication further comprises: decrypting the encrypted data using server public key of the recipient; decrypting the public key decrypted data using recipient private key, and encoding and storing the decrypted data on the local storage medium of the system.

In one embodiment, the step of encrypting data communicated between one or more senders and receivers via point to multi-point communication further comprises, creating a unique public key for a group, wherein the members of the group receive the public key; encrypting the data using encoded group public key; sending the encrypted data to the server, and decrypting the data of sender of the group using encoded group public key and stored private key of individual members of the group. In another embodiment, the data communicated between one or more senders and receiver via the point to multi-point communication mode is encrypted by the server or computing device using a QR-code including a pair of QR private key and QR public key.

In one embodiment, the step of decrypting data communicated between one or more senders and receivers via point to multi-point communication comprises, creating a unique public key for a group, wherein the members of the group receive the public key, and encrypting the data using encoded group public key, and decrypting the data using stored private key of individual members of the group.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention discloses a system and method for securing data communication between one or more senders and receivers. The system is configured to provide secure communication of information such as message, voice, and video data, and files between users one or more senders and receivers over IP communication.

Reference will now be made in detail to various embodiments. Each example is provided by way of explanation, and is not meant as a limitation and does not constitute a definition of all possible embodiments. The described embodiments are to be considered in all respects only as illustrative and not restrictive. For purposes of illustrating features of the embodiments, a simple example will now be introduced and referenced throughout the disclosure. Those skilled in the art will recognize that this example is illustrative and not limiting and is provided purely for explanatory purposes. An example of a computing system environment is disclosed. The computing system environment is not intended to suggest any limitation as to the scope of use or functionality of the system and method described herein. Neither should the computing environment be interpreted as having any dependency or requirement relating to any one or combination of components illustrated in the exemplary operating environment.

Embodiments of the disclosure are operational with numerous other general purposes or special purpose computing system environments or configurations. Examples of well-known computing systems, environments, and/or configurations that may be suitable for use with the systems and methods described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The embodiments of the disclosure may be described in the general context of computer-executable instructions, such as program modules, being executed by a computer. Generally, program modules include routines, programs, objects, components, data structures, etc. that perform particular tasks or implement particular abstract data types. The systems and methods described herein may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the exemplary embodiments as processor executable instructions, which can be written on any form of a computer readable media in a corresponding computing environment according to this disclosure.

Components of computer may include, but are not limited to, a processing unit, a system memory, and a system bus that couple various system components including the system memory to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer includes a variety of computer readable media. Computer readable media can be any available media that can be accessed by computer and includes both volatile and non-volatile media, removable and non-removable media. By way of example, and not limitation, computer readable media may include computer storage media and communication media. Computer storage media includes both volatile and non-volatile, removable and non-removable media implemented in any method or technology for storage of information such as computer readable instructions, data structures, program modules or other data. Computer storage media includes, but not limited to, Random Access Memory (RAM), Read-Only Memory (ROM), Electrically Erasable Read-Only Memory (EEPROM), flash memory or other memory technology, Compact Disk Read-Only Optical Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer.

Communication media embodies one or more of computer readable instructions, data structures, program modules, and the like, and/or other data in a modulated data signal such as a carrier wave or other transport mechanism, and may include any known information delivery media consistent with this disclosure. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory includes computer storage media in the form of volatile and/or non-volatile memory such as read only memory (ROM) and random-access memory (RAM). A basic input/output system (BIOS), containing the basic routines that help to transfer information between elements within computer, such as during start-up, may be stored in ROM. RAM may contain data and/or program modules that are readily accessible by a processing unit. By way of example, and not limitation, such data and/or program modules may include an operating system, application programs, other program modules, and program data.

The computer may also include other removable/non-removable volatile/non-volatile computer storage media. By way of example only, a hard disk drive that reads from or writes to non-removable, non-volatile magnetic media, a magnetic disk drive that reads from or writes to a removable, non-volatile magnetic disk, and an optical disk drive that reads from or writes to a removable, non-volatile optical disk such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive may be connected to the system bus through a non-removable memory interface, and magnetic disk drive and optical disk drive may be connected to the system bus by a removable memory interface.

The drives and their associated computer storage media provide storage of computer readable instructions, data structures, program modules and other data for the computer. For example, hard disk drive disclosed stores operating system, application programs, other program modules, and program data. Each of the storing operating system, the application programs, the other program modules, and the program data may be the same as or different from the operating system, the application programs, the other program modules, and the program data described hereinabove. The operating system, the application programs, the other program modules, and the program data are given different numbers here to illustrate that, at a minimum, they are different copies.

A user may enter commands and information into the computer through input devices such as a keyboard, a microphone, and a pointing device, such as a mouse, trackball or touch pad. Other input devices (not shown) may include a joystick, game pad, satellite dish, scanner, or the like. These and other input devices may be connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. In addition to the monitor, computers may also include other peripheral output devices such as speakers and printer, which may be connected through an output peripheral interface.

The computer may operate in a networked environment using logical connections to one or more remote computers, such as a remote computer. The remote computer may be a personal computer, a hand-held device, a server, a router, a network PC, a peer device or other common network node, and may include one, more or all of the elements described above relative to the computer. The logical connections include a local area network (LAN) and a wide area network (WAN). It is contemplated that the logical connections may include other networks. These other networks may be included in combination with the LAN and WAN. Such networking environments are commonplace in offices, enterprise-wide computer networks, intranets and the Internet.

When used in a LAN networking environment, the computer is connected to the LAN through a network interface or adapter. When used in a WAN networking environment, the computer includes a modem or other means for establishing communications over the WAN, such as the Internet. The modem, which may be internal or external, may be connected to the system bus via the user input interface, or other appropriate mechanism. In a networked environment, program modules depicted relative to the computer, or portions thereof, may be stored in a remote memory storage device. It will be appreciated that the network connections shown are exemplary and other means of establishing a communications link between the computers may be used.

Figure 1:
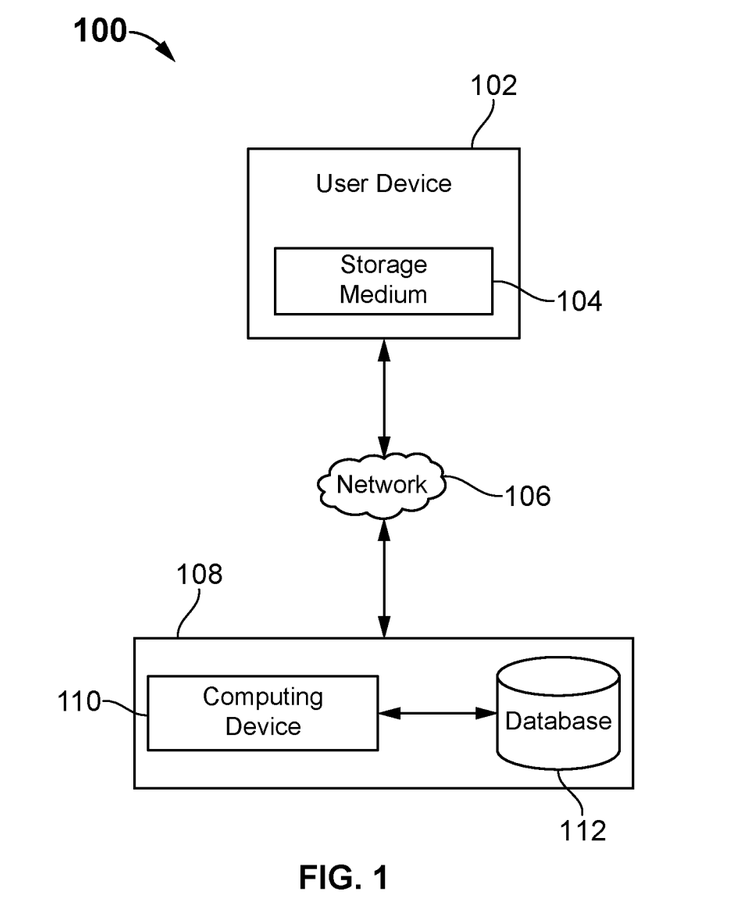
FIG. 1 exemplarily illustrates a block diagram of an environment implemented according to an embodiment of the present invention.

Referring to FIG. 1, a block diagram of an environment 100 implemented in accordance with various embodiments of the present invention is disclosed. The environment 100 comprises a user device 102, a network 106, and a data securing system 108. In an embodiment, the data securing system 108 comprises a computing device 110 and at least one database 112. In one embodiment, the computing device 110 is a server or a data securing server. In an embodiment, the user device 102 is enabled to access the data securing system 108 via the network 106. In an embodiment, the user device 102 is at least one of a desktop, a laptop, a tablet, a mobile phone, and mobile and/or handheld electronic devices. In an embodiment, the user device 102 including a storage medium 104 is in communication with the network 106 to access the computing device 110. In one embodiment, the storage medium 104 is an end user application data storage. In an embodiment, the network 106 could be Wi-Fi network, WiMAX network, and wireless local area network.

In one embodiment, the database 112 is accessible by the computing device 110. In another embodiment, the database 112 is integrated into the computing device 110 or separate from it. In some embodiments, the database 112 resides in a connected server or in a cloud computing service. Regardless of location, the database 112 comprises a memory to store and organize certain data for use by the server. In one embodiment, the computing device 110 is at least one of a general or special purpose computer. The computing device 110 could be operated as a single computer, which can be a hardware and/or software server, a workstation, a desktop, a laptop, a tablet, a mobile phone, a mainframe, a supercomputer, a server farm, and so forth. In some embodiments, the computer could be touchscreen and/or non-touchscreen and adopted to run on any type of OS, such as iOS™, Windows™, Android™, Unix™, Linux™ and/or others. In one embodiment, the plurality of computers is in communication with each other, via networks. Such communication can be via a software application, a mobile app, a browser, an OS, and/or any combination thereof.

In one embodiment, the computing device or computing device 110 comprises a processor and a memory in communication with the processor. The memory stores a set of instructions executable by the processor. The computing device 110 is configured to collect one or more parameters from the user device 102. The computing device 110 is further configured to generate a seed key based on the parameters using a digest algorithm.

Figure 2:
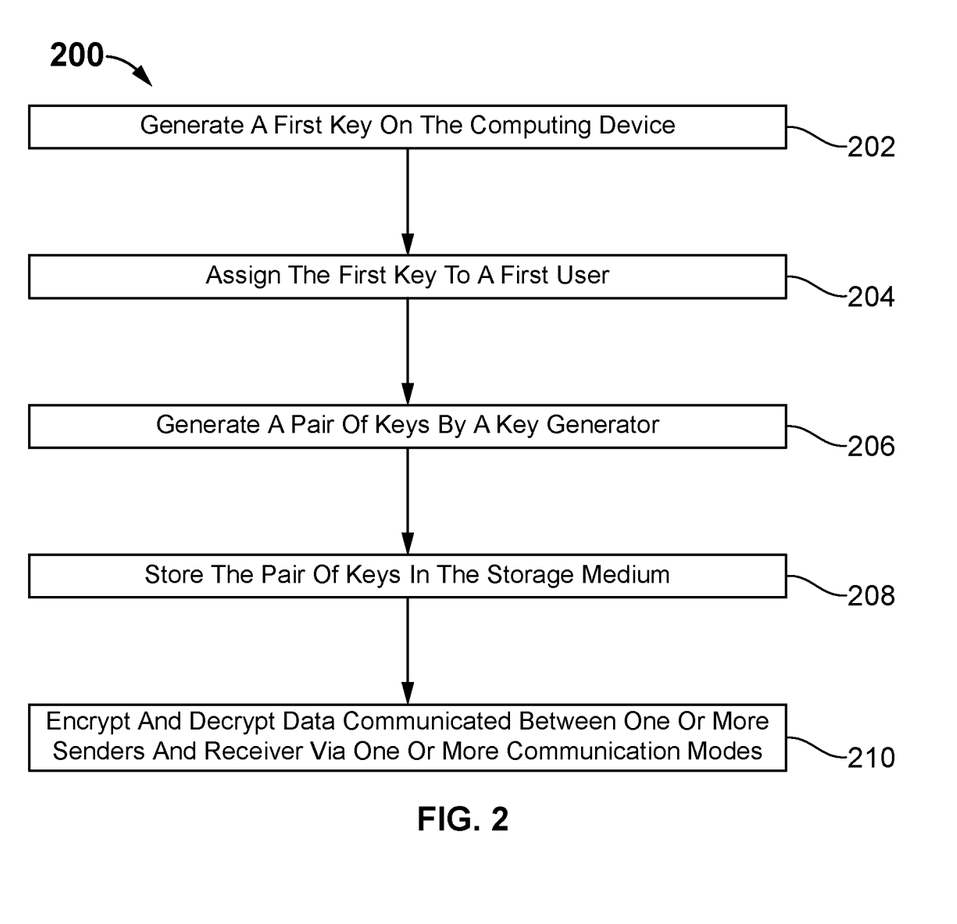
FIG. 2 exemplarily illustrates a method for securing data communication between one or more senders and recipients according to an embodiment of the present invention.

Referring to FIG. 2, a method 200 for securing data communication between one or more senders and receivers comprising a computing device comprising a processor and a memory in communication with the processor, wherein the memory stores a set of instructions executable by the processor, a database in communication with the computing device, and a user device associated with each sender and receiver including the storage medium is configured to access the computing device via a network. The method 200 comprises the step 202 of: generating a first key on the computing device on initiating communication between sender and recipient. In one embodiment, the first key is a server generated key. The method 200 further comprises a step 204 of: Assign the key to the user. The method 200 further comprises a step 206 of: generating a pair of keys by a key generator, the pair of keys include a second key and a third key. The method 200 further comprises a step 208 of: storing the pair of keys in the storage medium. The method 200 further comprises a step 210 of: encrypting and decrypting data communicated between one or more senders and receivers via one or more communication modes.

Figure 3:
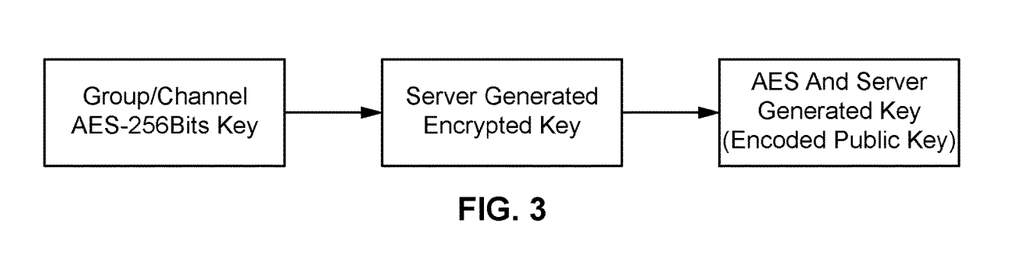
FIG. 3 exemplarily illustrates the generation of Unique server public key according to an embodiment of the present invention.

The present invention provides a complete package consisting of procedures and encryptions to ensure the quality of encryption and/or key generation. FIG. 3 exemplarily illustrates a block diagram 300 of a system for generating a seed key in an embodiment of the present invention. In one embodiment, the system comprising a computing device comprising a processor and a memory in communication with the processor, wherein the memory stores a key generator (not shown in figure) executable by the processor, a database in communication with the computing device, and a user device including the storage medium is configured to access the computing device via a network. When a user installing an application, successfully signing up into any application or website, a first key is generated on the computing device. The generated first key is a plain key and is not used foe communication until it gets encrypted. A unique Advanced Encryption Standard (AES) passHash is assigned by the computing device to encrypt and decrypt the generated key. This encrypted key is encoded server generated public key and shared with a recipient.

The encrypted key is encoded passHash of received passHash and utilized for the following applications. If the passHash is leaked for any reason, the actual hash depends on the encrypted key, which is not known until the final installation of the user application. In another embodiment, for channel or group communication, each member of the group has different encrypted message content/data which is very important. For instance, in the countries, the government wants to sniff the internet traffic. Hence, the known passHash of a group allows to locate the members of the group through decoding the user traffics by just being a member. In such case, network traffic will arise and data for each single member of a group/channel is unique and group key is just a useless value to decrypt other members traffic or identify them. In another embodiment, the banned user's traffic is not encrypted within the server flow. Also, it is important that the whole network payload delivers through a secured HTTPS SSL GRAPHQL transport, which adds more security over the communication line.

Figure 4:
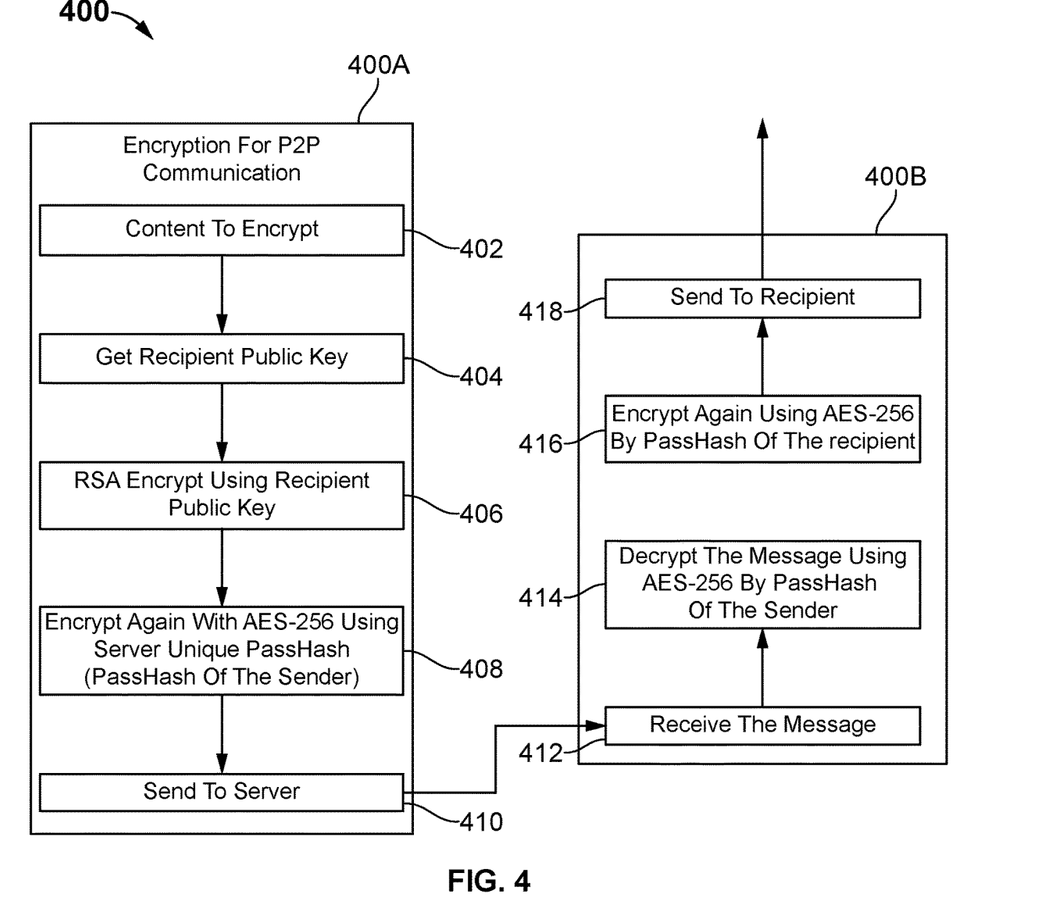
FIG. 4 exemplarily illustrates a method for encrypting data communicated via point to point communication according to an embodiment of the present invention.

Referring to FIG. 4, a method 400 of encrypting data communicated via point to point communication between one or more senders and receivers comprising a computing device comprising a processor and a memory in communication with the processor, wherein the memory stores a set of instructions executable by the processor, a database in communication with the computing device, and a user device associated with each sender and receiver includes a storage medium configured to access the computing device via a network. In the process of encrypting data for sending to a single recipient via point to point communication, the encryption algorithm utilizes recipient/user public key and server AES-256 passHash. In one embodiment, the user public key is a 4096 bits RSA key which is shared with the contacts of the user. In one embodiment, the server AES-256 passHash is a unique key between each user/client and server. In one embodiment, a unique passHash value is provided for each user device.

In point to point communication mode, the message content is encrypted using RSA by a second key, which leads the encrypted content to be decrypted only by a third key of the particular user/recipient. In one embodiment, the second key is a user/recipient public key and the third key is user/recipient private key. In one embodiment, the method of encrypting the message content at sender end 400A is explained from step 402 to step 410. At step 402, after successful sign up, the server receives a request to encrypt the message content/data. At step 404, the server shares the user/recipient public key. At step 406, the content encrypted using RSA by user/recipient public key. At step 408, encrypt the public key encrypted content obtained in step 406 with AES-256 using unique server passHash of the sender. At step 410, the encrypted message content of step 408 is sent to the server. The message encryption at server end 400B is explained from step 412 to step 418. At step 412, the server receives the encrypted message content. At step 414, the server decrypts the encrypted message content using AES-256 passHash of the sender. At step 416, the server encrypts the decrypted content of step 414 with AES-256 passHash of the recipient. At step 418, the server sends the encrypted message content to the recipient.

Figure 5:
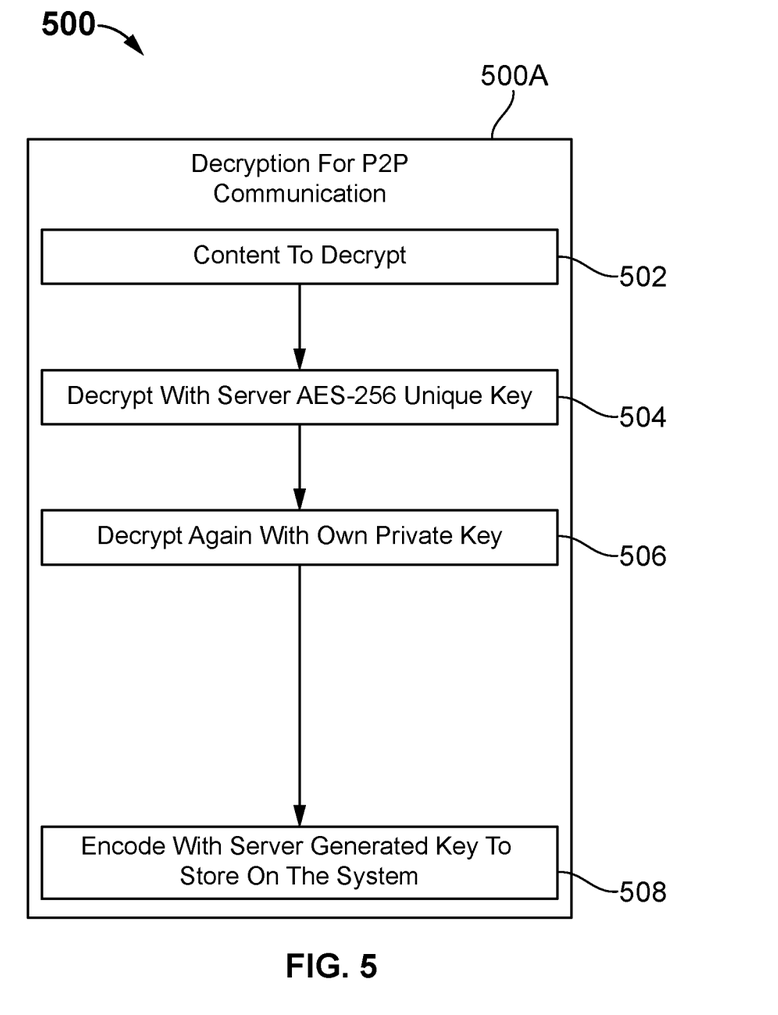
FIG. 5 exemplarily illustrates a method for decrypting data communicated via point to point communication according to an embodiment of the present invention.

Referring to FIG. 5, a method 500 of decrypting data communicated via point to point communication between one or more senders and receivers is disclosed, according to an embodiment of the present invention. In the process of decrypting data at recipient end 500A via point to point communication, the decryption algorithm utilizes a unique AES-256 passHash for data decryption and RSA algorithm for data decoding using private key. At step 502, the user device/application at recipient end receives the message content to decrypt. At step 504, the received message content decrypted with server AES-256 unique key. In case of failure of AES key encryption, the message to be encrypted us shared with the server and the server application makes decision. In one embodiment, the server application decides to regenerate and handshake/share the keys for data encryption or decryption. In another embodiment, the server application decides to invalidate the application signup. At step 506, the server decrypted message content again decrypted with its own private key, which is a recipient private key. At step 508, the decrypted message content is encoded and stored locally on the system.

Figure 6:
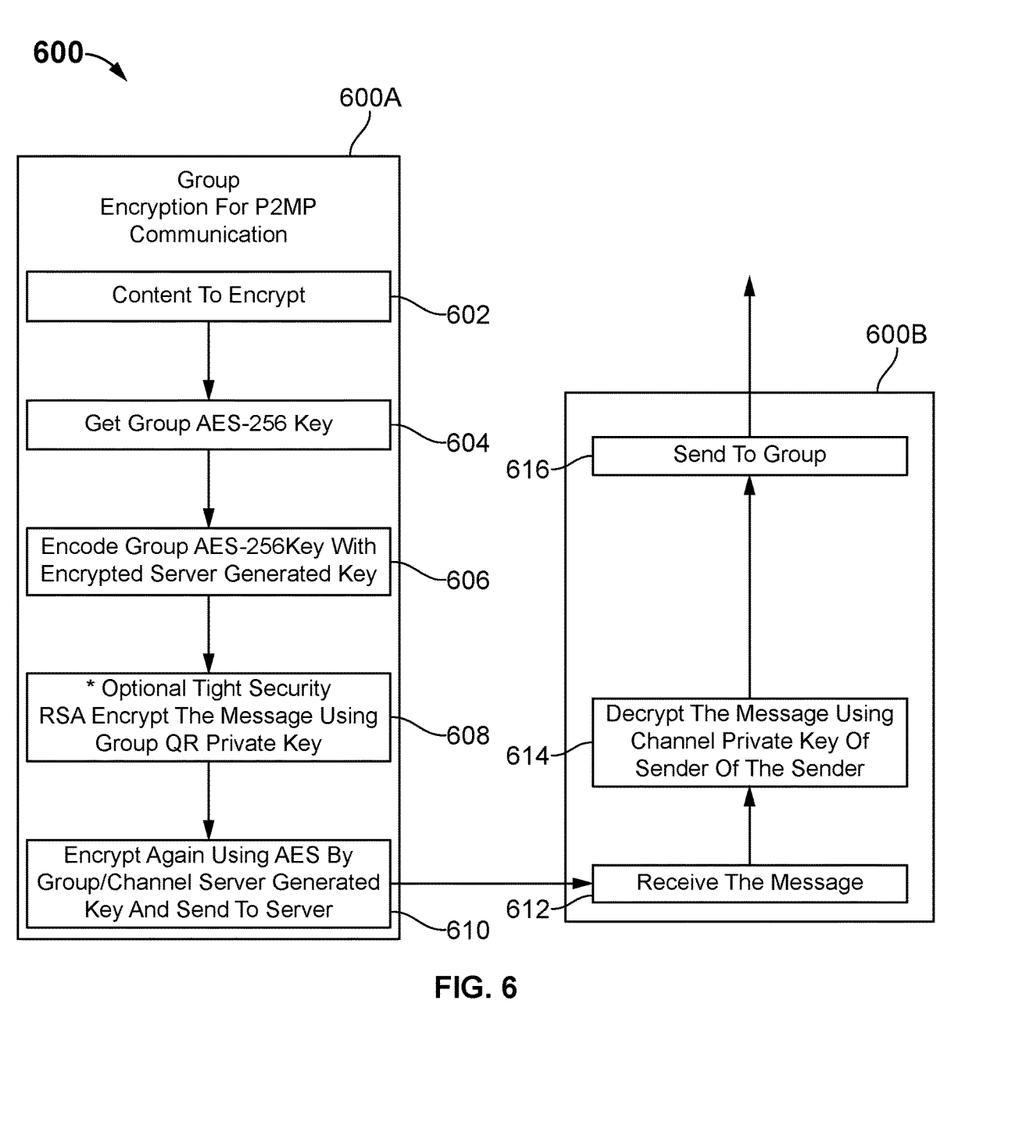
FIG. 6 exemplarily illustrates a method for encrypting data communicated via point to multi-point communication according to an embodiment of the present invention.

Referring to FIG. 6, a method 600 of encrypting data communicated via point to multi-point communication is disclosed. Upon generation of a group/channel, the group includes one or more AES-256 bit key, which could be received by the members of the group. In point to multi-point communication mode, the admins and moderators only could send message and all other messages from non admin/moderators/other members of the group will be ignored. The group AES-256 key is a plain key and is not used to communicate with the server. Hence, each user/member of the group encrypts or decrypts the group key with server generated key, thereby each member of the group will get unique encoded content. This type of encryption or decryption prevents the blocked users/members to pass messages to the group. In one embodiment, the individual encryption and decryption of each members protect the group from unauthorized access, even with known AES key since, the server fetches only the server generated key of valid members. Further, it provides group access level authorization on the bottom of the group flow access control algorithm.

The process of encrypting the data at sender end 600A for point to multi-point communication is explained from step 602 to step 610. At step 602, the server receives a request to encrypt the message content from the group/channel. At step 604, the server gets the group AES-256 key of the particular group. At step 606, the group AES-256 key is encoded with server generated encrypted key. Optionally, at step 608, the RSA algorithm encrypts the message content using group QR key. If members of the group have added QR code, the message is encoded using group QR private key. In one embodiment, the group QR key includes group private QR key and group public QR key. In another embodiment, the group QR keys are imported to the application. This key is not shared with the server and each member of the group must have those pair keys, else the message sent using this key will not be decoded for them. At step 610, the encoded key from step 606 is again encrypted using AES by group/channel key before sending to the server. In one embodiment, the group/channel key is the private key of group admins/moderators. The process of decrypting the data at server end 600B for point to multi-point communication is explained from step 612 to step 616. At step 612, the server receives the encrypted message and removes their RSA encryption. At step 614, the encrypted message is decrypted using channel generated key of an admin, a moderator or user from sending end. At step 614, the decrypted message is sent to the group.

Figure 7:
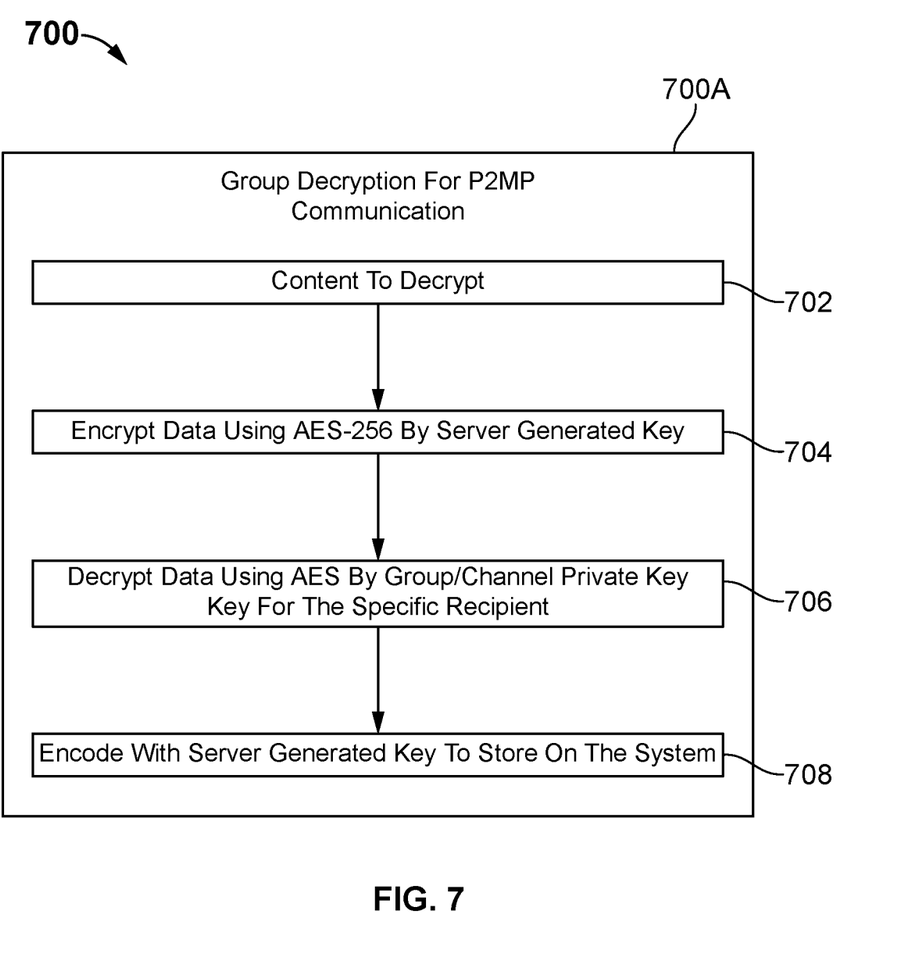
FIG. 7 exemplarily illustrates a method for decrypting data communicated via point to multi-point communication according to an embodiment of the present invention.

Referring to FIG. 7, a method 700 for decrypting the data communicated via point to multi-point communication mode is disclosed, according to an embodiment of the present invention. The method of decrypting the data at recipient end 700A is same as the method of encrypting the data at sender end 600A and at the end the data gets decrypted instead of encrypt as explained in FIG. 6. When user application fetches data, the data will be encoded using AES-256 by AES server generated key for that specific recipient. The process of decrypting the data at recipient end 700A for point to multi-point communication is explained from step 702 to 708. At step 702, the server receives a request to decrypt the message content from the group/channel. At step 704, the server gets the group AES-256 key of the particular group. At step 606, the group AES-256 key is encoded with server generated encrypted key. At step 706, the encrypted content is decrypted using AES group/channel generated key and sent to the server. In one embodiment, the group/channel encrypted key is a group/channel private key. At step 708, the message is encoded using AES-256 by the stored AES private key of that specific recipient and stored on the system.

According to the present invention, the system works under any operating system (including, without limitation, DOS, OS/2, and AIX) to protect all confidential information on a computer disk or other storage media during those periods in which the machine is not in use. The invention protects against thieves, lunchtime attacks and other invasions of privacy. The invention is useful on so-called "portables" (i.e., laptop, notebook and subnotebook computers), desktop machines (i.e., personal computers or workstations), pen-based machines, other handheld computers including personal data assistants ("PDA's"), smartcards and the like. The present invention could be used in login, data storage and signup process.

Further, the encryption system ensures the server/client communication by providing a heavily encoded content by 4096 bit RSA, AES-256 bit and server generated key. The system ensures post quantum protection against reverse brute force attack. It ensures the recipient that the message is received from the expected sender. Also, the system ensures that no other application installation could communicate with server, even by having the public key. It ensures only recipient of the message could decode the message and reverse prevents decryption of data (may takes up to thousands of years to crack). The server handles the communication between users, so that the content cannot be accessed by any third parties. The system provides a fast and very low resource usage method for the server to validate a message and ignore attackers messages without causing high usage of resources. It provides VoIP SRTP communication without requiring key handshakes. The encrypted file sharing with fast decryption and the possibility of sending the encrypted file to more than one recipient, is defined by the sender of the content. In addition, the system provides a secure push notification service for event-based system like Navi Sync and GixSockets. Further, the system uses authorization key platform such as, ICE/STUN Nat Traversal Solution.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A system for securing communication between one or more senders and recipients comprising:
    a server including a processor and a memory in communication with the processor, wherein the memory stores a set of instructions executable by the processor;
    a database in communication with the server, and
    a user device associated with each sender and receiver including a storage medium configured to access the server via a network, wherein the set of instructions when executed by the processor, cause the processor to:
        generate a first key, the first key based on AES algorithm and a parameter received from the user device,
        assign the first key to the user device,
        generate a pair of keys by a key generator, the pair of keys include a second key and a third key, the second key is a user public key and the third key is a user private key,
        store the pair of keys in the storage medium of the user device,
        receive a dual encrypted data from the sender's user device, wherein data at the sender's user device is first encrypted by the recipient's second key, and thereafter the encrypted data is again encrypted with the sender's first key,
        decrypt the dual encrypted data, received from the sender's user device, using the sender's first key,
        encrypt the decrypted dual encrypted data using the recipient's first key, and send the encrypted data to the recipient's user device.

2. The system of claim 1, wherein the processor seed one or more random keys for creating a pair of keys.

3. The system of claim 1, wherein the recipient's user device receives the encrypted data from the server,
    decrypt the encrypted data using the recipient's first key, thereafter again decrypt data using the recipient's third key.

4. The system of claim 1, wherein the processor:
create a unique group public key for a group, wherein members of the group receive the group public key,
receive a group encrypted data, wherein the group encrypted data is encrypted using the group public key, wherein the group encrypted data is decrypted by the members of the group using the group public key and the third key of the members of the group.

5. The system of claim 1, wherein the processor:
create a unique group public key for a group, wherein members of the group receive the group public key, and
receive the group encrypted data from a member of the group, the group encrypted data encrypted using the group public key, and
decrypt the group encrypted data using the group public key,
encrypt the decrypted group data using the member's second key, wherein the members decrypt the encrypted group data using their third key.

6. A method for securing communication between one or more senders and recipients comprising the steps of:
generating a first key, by a server, the first key based on AES algorithm and a parameter received from a user device, the user device associated with each of sender and receiver;
assigning the first key to the recipient's user device;
generating a pair of keys by a key generator, the pair of keys include a second key and a third key, the second key is a user public key and the third key is a user private key;
storing the pair of keys in a storage medium of the user device;
encrypting a data, by the sender's user device, using the recipient's second key to a first data;
encrypting the first data, by the sender's user device, using the sender's first key, to the second data;
receiving, by the server, the second data;
decrypting, by the server, the second data to the first data, using the sender's first key; and
encrypting, by the server, the first data to a third data, using the recipient's first key.

7. The method of claim 6, wherein the method further comprises a step of seeding one or more random keys, by the server, for creating a pair of keys.

8. The method of claim 6, wherein the method further comprises steps of:
receiving the third data, by the recipient's user device;
decrypting the third data, by the recipient's user device, using the recipient's first key, to the first data; and
decrypting the first data, by the recipient's user device, to the data using the recipient's third key.

9. The method of claim 6, wherein the method further comprises step of:
creating a unique group public key, wherein members of the group receive the group public key;
encrypting, by a sender, the data using the group public key,
sending the encrypted data to the server, and
decrypting the data, by the members, using the group public key and the member's third key.

10. The method of claim 6, further comprises a step of encrypting data using a QR code including a pair of QR private key and QR public key.

11. The method of claim 6, wherein the method further comprises steps of:
creating, by the server, a group public key, wherein members of the group receive the group public key, and
encrypting, by a sender, the data using the group public key, and decrypting the data, by members, using members third key.

* * * * *